Feb. 21, 1950 W. C. JOHNSON 2,498,275
METHOD OF PRODUCING PROPELLER CONSTRUCTIONS
Filed Sept. 25, 1945 10 Sheets-Sheet 1
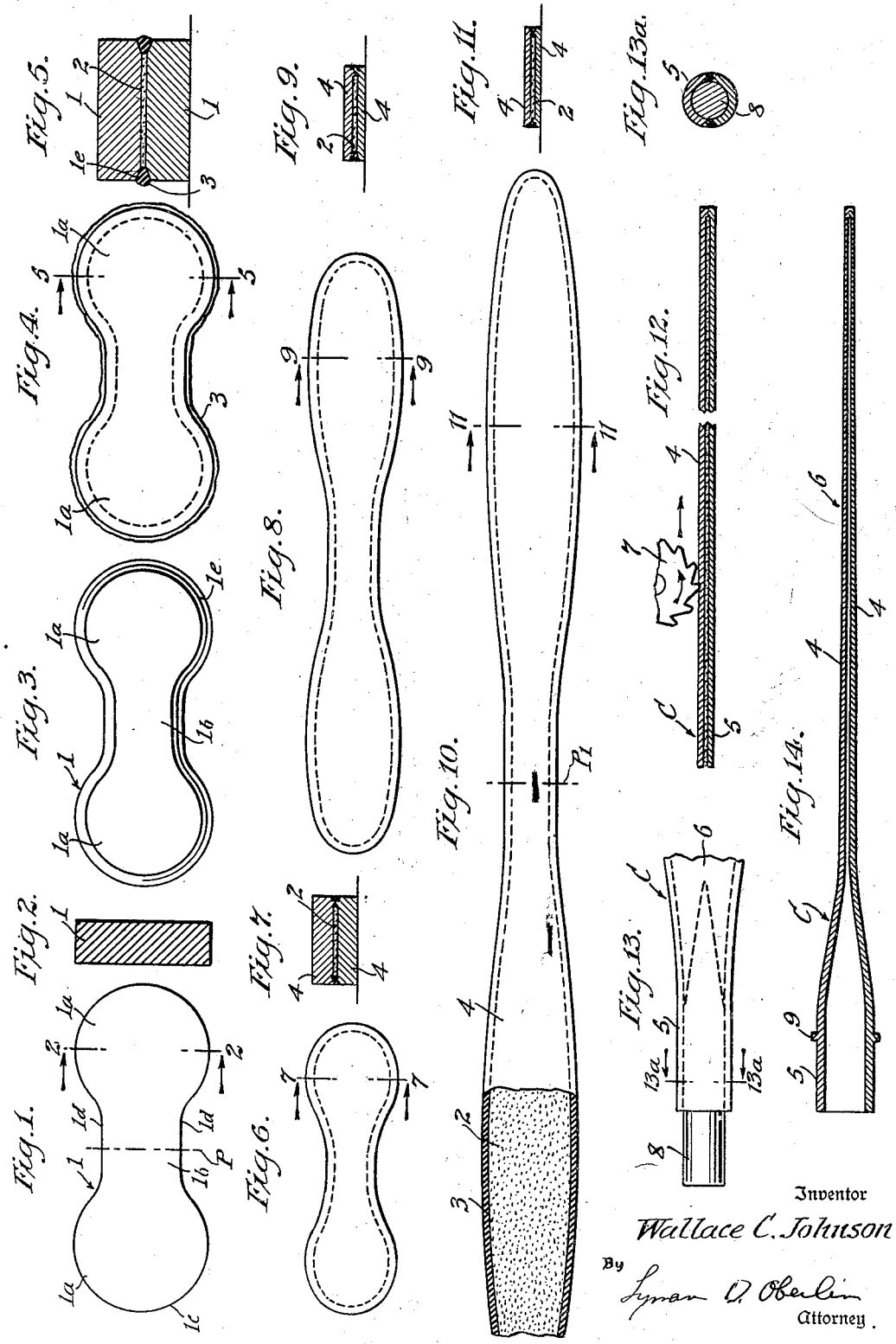
Inventor
Wallace C. Johnson
By Lyman O. Oberlin
Attorney

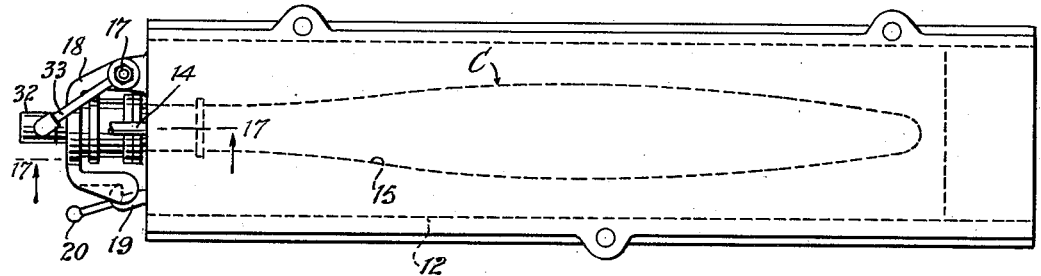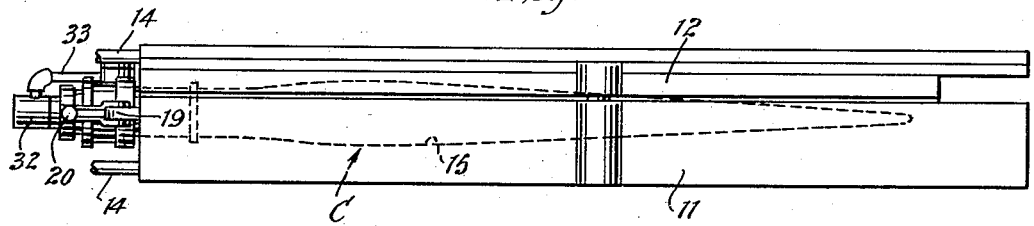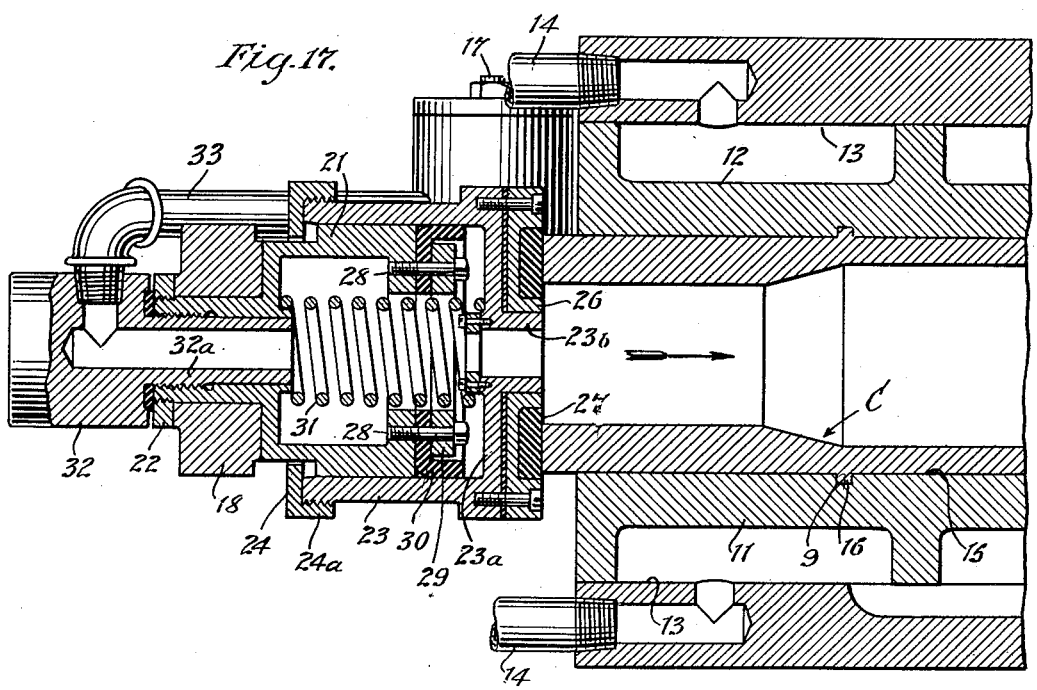

Feb. 21, 1950 W. C. JOHNSON 2,498,275
METHOD OF PRODUCING PROPELLER CONSTRUCTIONS
Filed Sept. 25, 1945 10 Sheets-Sheet 3
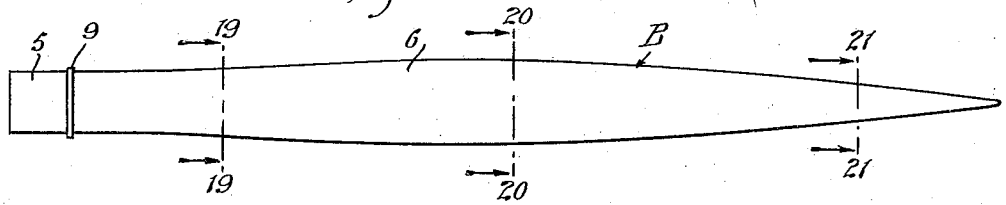
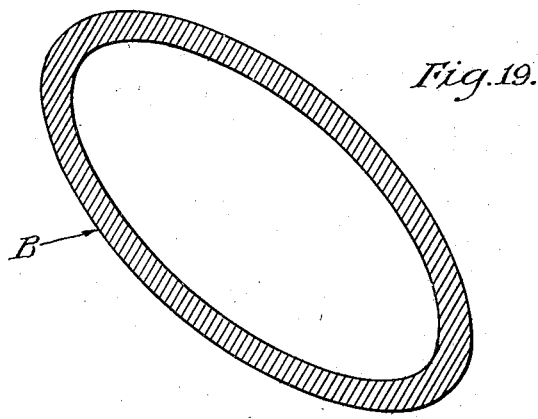
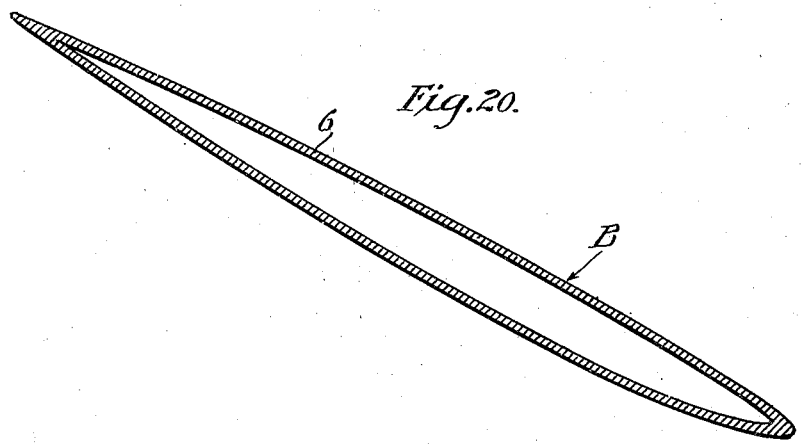
Inventor
Wallace C. Johnson
By Lyman D. Oberlin
Attorney

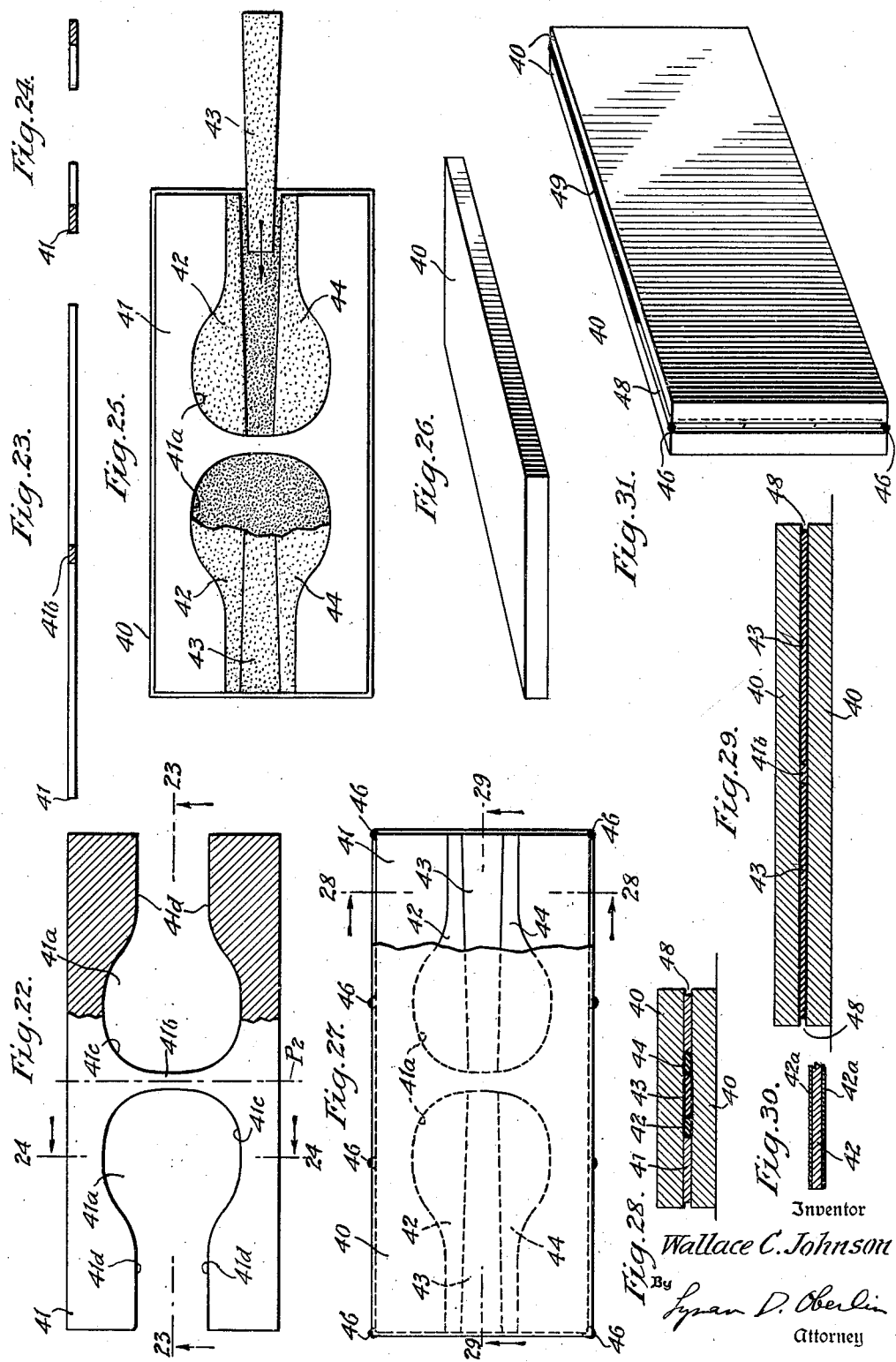

Feb. 21, 1950 W. C. JOHNSON 2,498,275
METHOD OF PRODUCING PROPELLER CONSTRUCTIONS
Filed Sept. 25, 1945 10 Sheets-Sheet 5

Inventor
Wallace C. Johnson
By Lyman D. Oberlin
Attorney

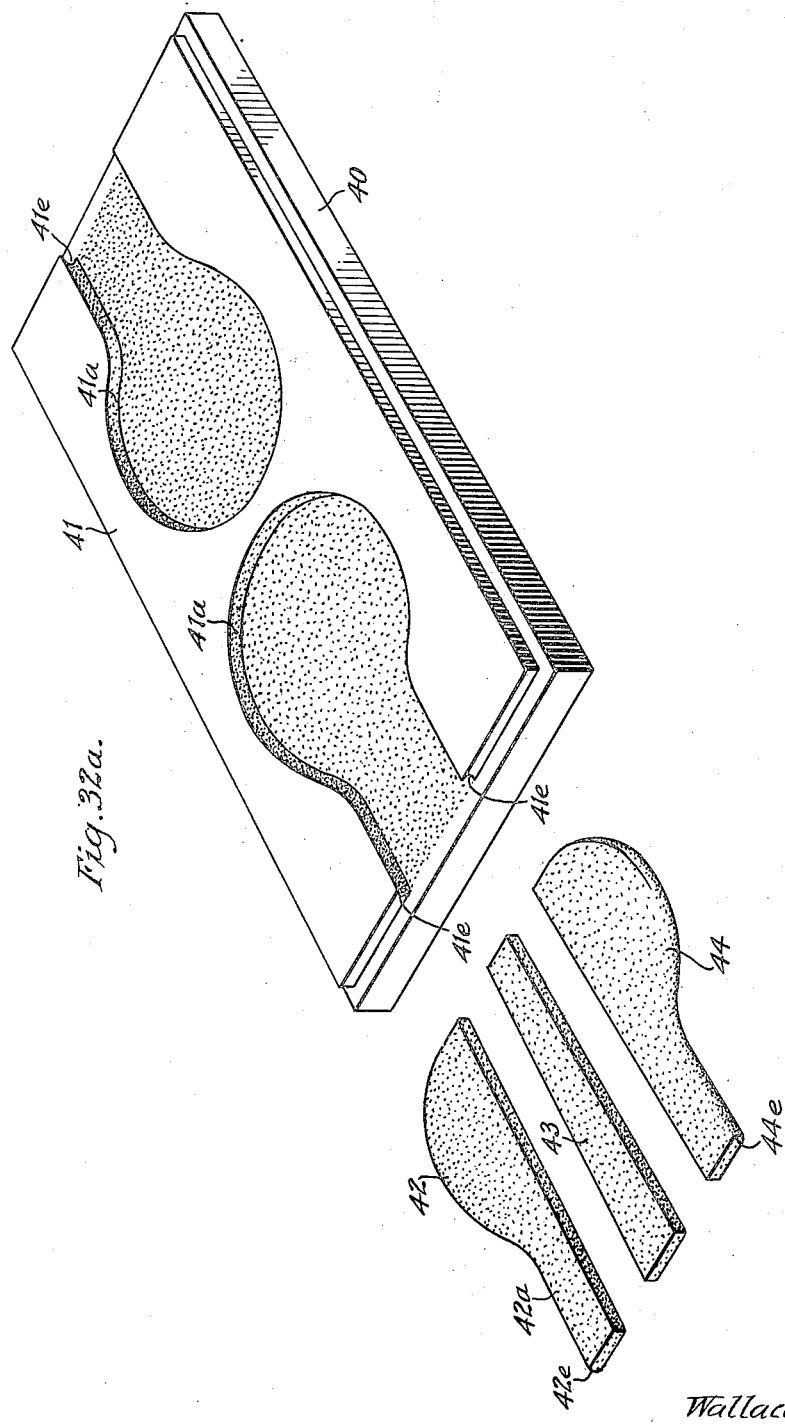

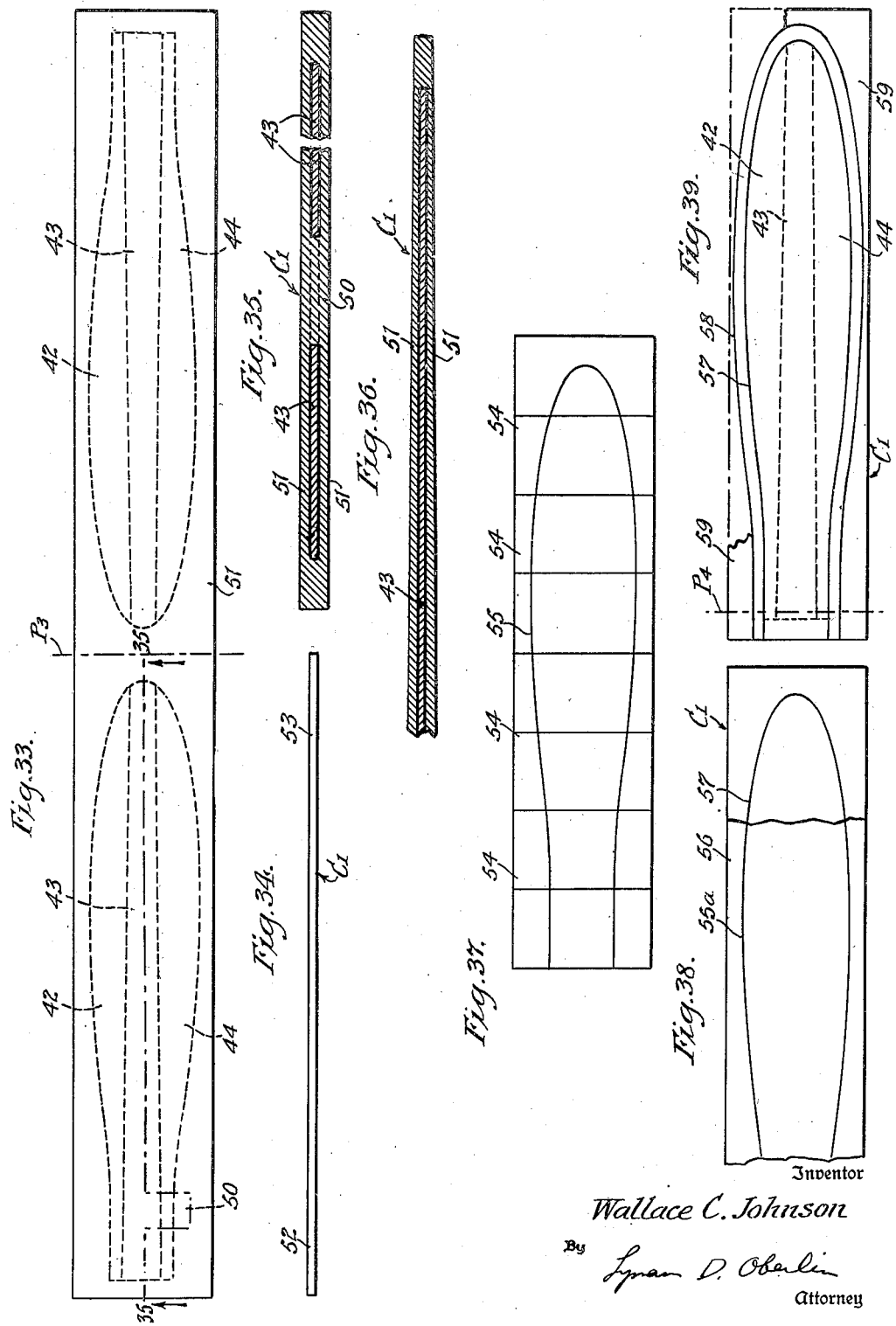

Inventor
Wallace C. Johnson
By
Lyman V. Oberlin
Attorney

Inventor
Wallace C. Johnson
By Lyman D. Oberlin
Attorney

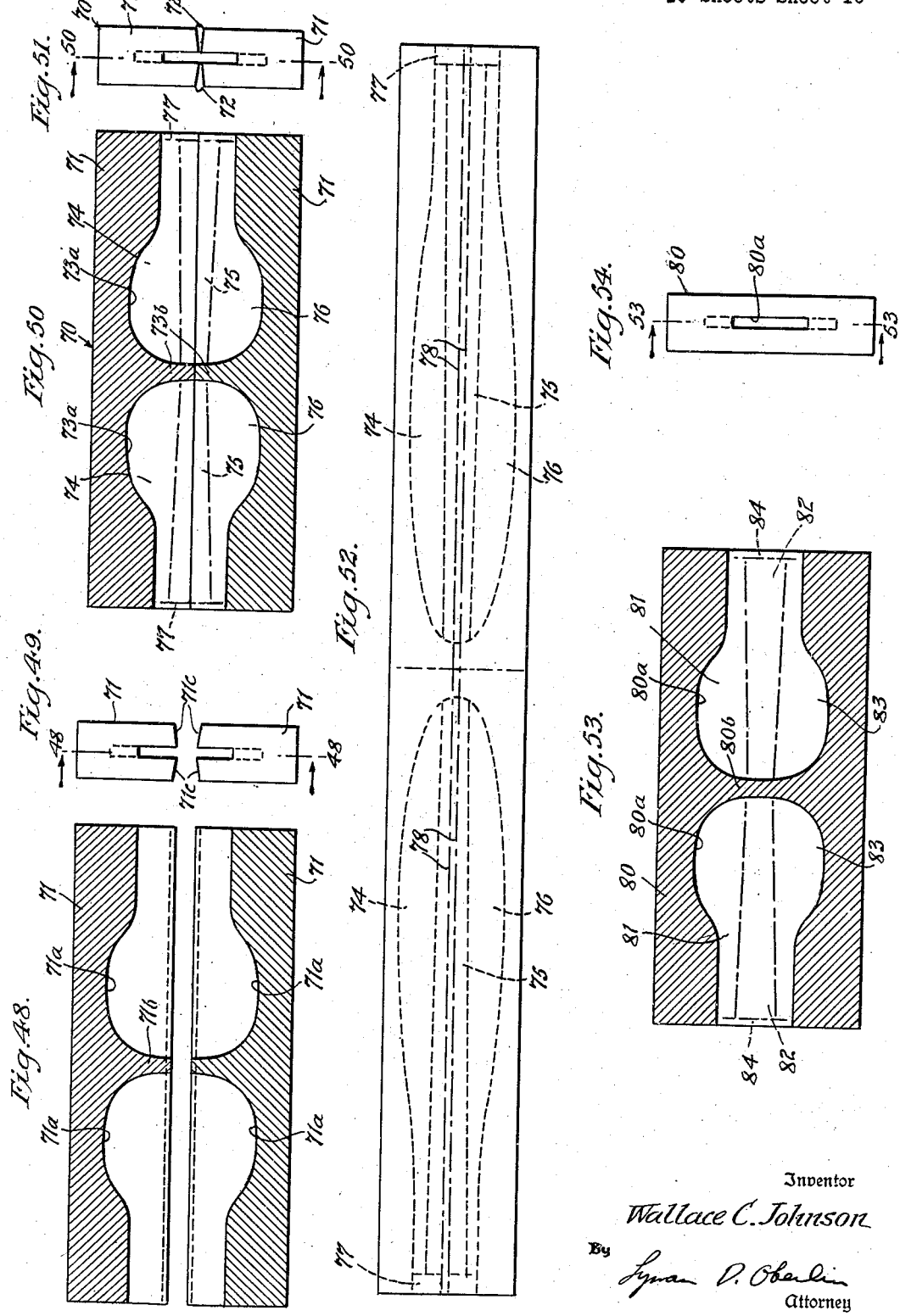

Patented Feb. 21, 1950

2,498,275

UNITED STATES PATENT OFFICE 2,498,275

METHOD OF PRODUCING PROPELLER CONSTRUCTIONS

Wallace C. Johnson, Kennett Square, Pa.

Application September 25, 1945, Serial No. 618,441

3 Claims. (Cl. 29—156.8)

My invention relates to block structures which are rolled to form propeller blade or other elongated constructions, to the resulting propeller blade or other elongated constructions and to the art of producing such propeller blade or other elongated constructions as well as the resulting hollow propeller blades or other hollow elongated structures. In this specification, the term "block structure" will be used to describe a block structure, as it exists before rolling, destined to form a hollow propeller blade or other hollow elongated structure; the term "elongated construction" will be used to describe a rolled block structure as it exists at any time before the finished elongated structure is formed therefrom; and the term "propeller blade construction" will be used to describe a rolled block structure as it exists at any time before the finished propeller blade is formed therefrom.

My invention has particular reference to a block structure destined to form a complete propeller blade, the block structure having extending longitudinally thereinto a sealed chamber or passage containing a parting agent, this chamber or passage having an outline in planform corresponding, in the manner hereinafter described and to such reduced degree as is desirable and proper, with the outline in planform of the chamber defined by the hollow propeller blade construction, without twist, of the size intended to be produced from said block structure, said passage being disposed midway between the parallel outer surfaces of said block structure.

My invention has further reference to the art of subjecting a block structure, as aforesaid, to a plurality of rolling operations to effect the final elongation thereof and to cause the outline in planform of its chamber of passage to correspond with the outline in planform of the chamber defined by the aforesaid hollow propeller blade which is substantially complete except that twist configuration has not been imparted thereto.

Still further, my invention has reference to the art of subjecting a finally elongated propeller blade construction, as aforesaid, to a shaping operation, while heated, to thereby impart final twist and final profile thereto.

Various other objects, advantages and features of my invention will become apparent from the following detailed description.

My invention resides in the block structures, the propeller blade constructions, the art of producing such block structures, propeller blade constructions and the resulting propeller blades, arrangements and combinations of the character hereinafter described and claimed.

For an understanding of my invention and for an illustration of some of the forms thereof, reference is to be had to the accompanying drawings, in which:

Figure 1 is a plan view of a block utilizable in accordance with the invention;

Fig. 2 is a transverse sectional view taken on the line 2—2 of Fig. 1;

Fig. 3 is a plan view showing the block of Fig. 1 after it has been subjected to a chamfering operation;

Fig. 4 is a plan view showing a block structure formed from a pair of the blocks shown in Figs. 1, 2 and 3;

Fig. 5 is a transverse sectional view taken on the line 5—5 of Fig. 4;

Fig. 6 is a plan view showing the resulting propeller blade construction resulting after the block structure of Fig. 5 has been subjected to one or more rolling operations;

Fig. 7 is a transverse sectional view taken on the line 7—7 of Fig. 6;

Fig. 8 is a plan view showing the propeller blade construction of Fig. 6 after it has been subjected to one or more additional rolling operations;

Fig. 9 is a transverse vertical sectional view taken on the line 9—9 of Fig. 8;

Fig. 10 is a plan view, partly broken away, showing the propeller blade construction of Fig. 8 after it has been subjected to the final rolling operation;

Fig. 11 is a transverse sectional view taken on the line 11—11 of Fig. 10;

Fig. 12 is a longitudinal sectional view illustrating a step of my novel method;

Fig. 13 is a fragmentary plan view illustrating another step of my novel method;

Fig. 13a is a transverse sectional view taken on the line 13a—13a of Fig. 13;

Fig. 14 is a longitudinal sectional view showing a substantially complete propeller blade construction of my invention;

Figs. 15 and 16 are plan and elevational view, respectively, showing a die arrangement for imparting twist to a propeller blade construction;

Fig. 17 is an enlarged, longitudinal sectional view, taken on the line 17—17 of Fig. 15 looking in the direction of the arrows;

Fig. 18 is an elevational view showing a propeller blade obtained from the propeller blade construction illustrated in Fig. 14;

Figure 32:
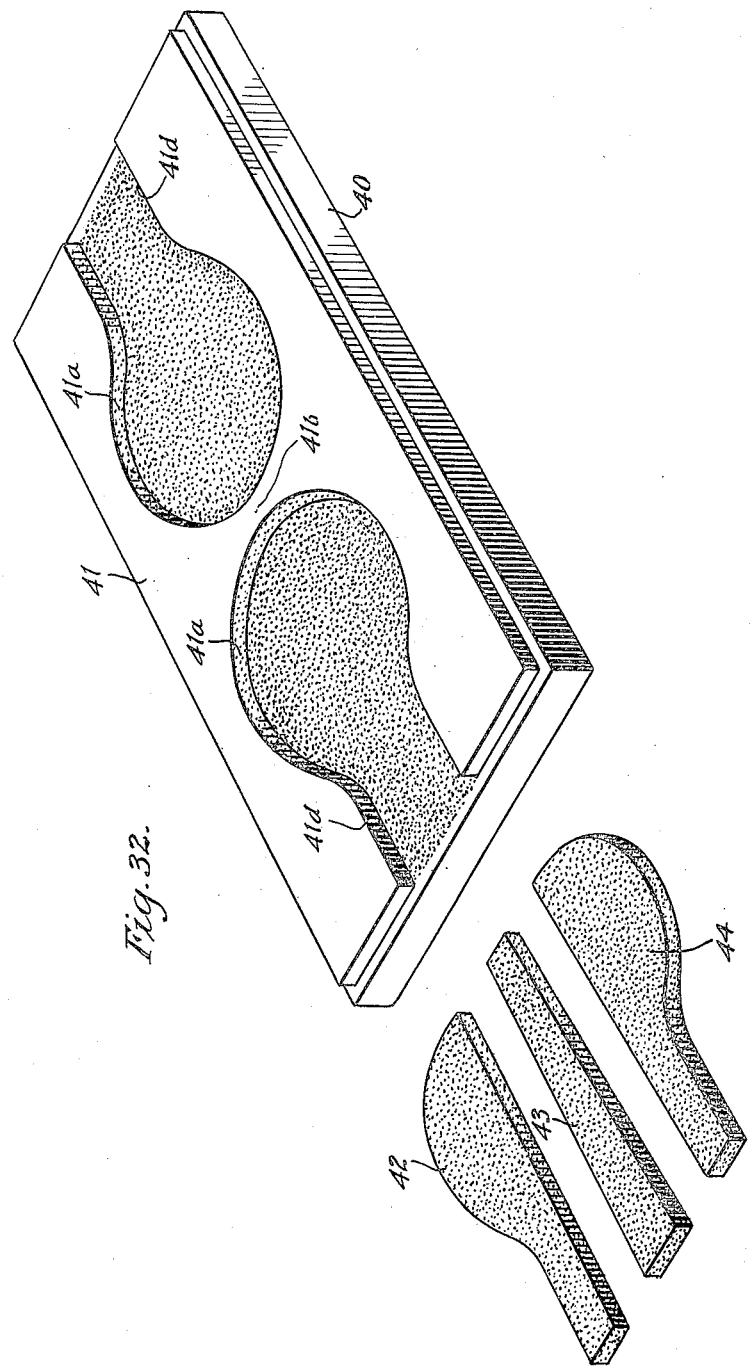
Figure 40:
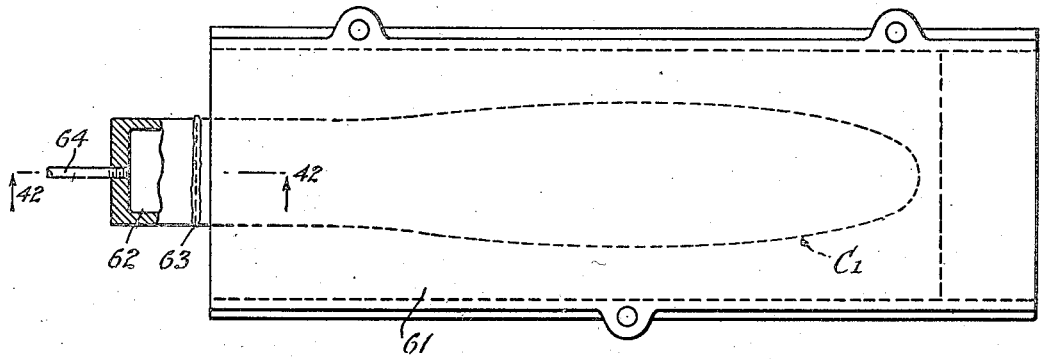
Figure 41:
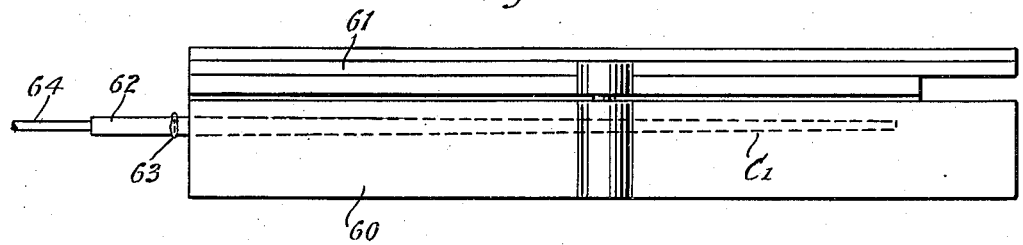
Figure 42:
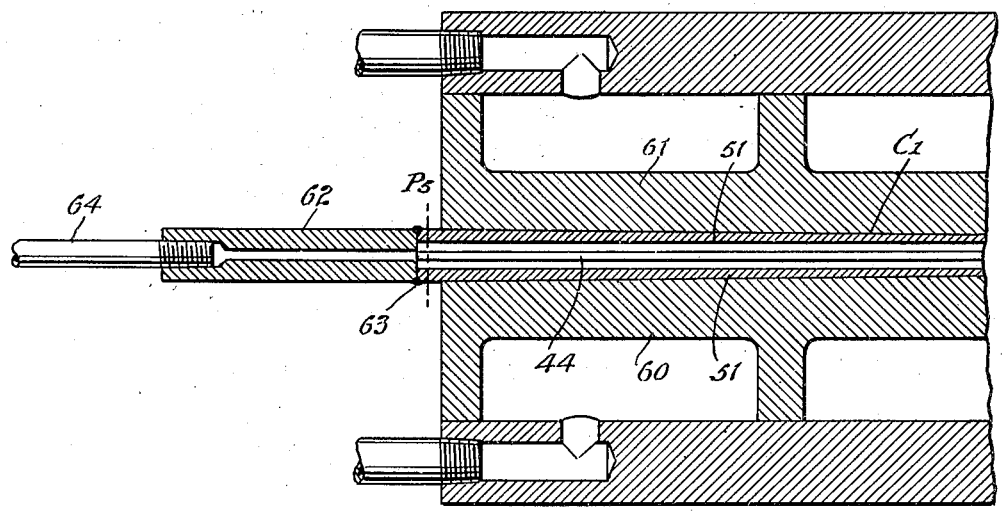
Figure 43:
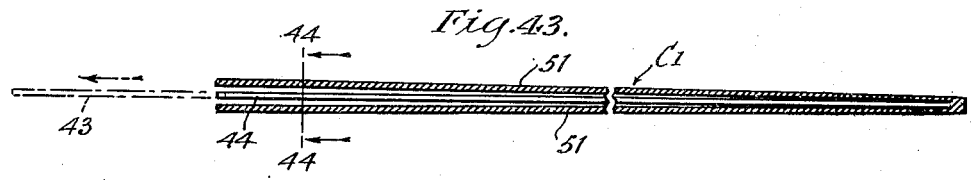
Figure 44:
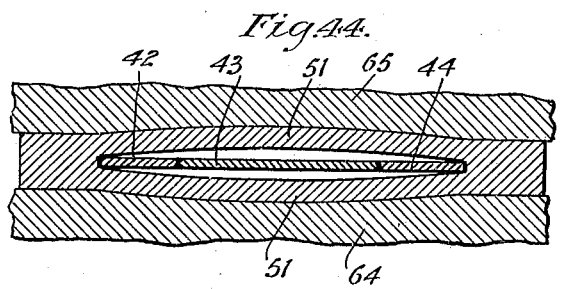
Figure 45:
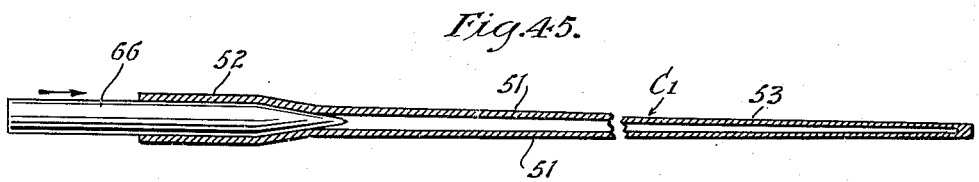
Figure 46:
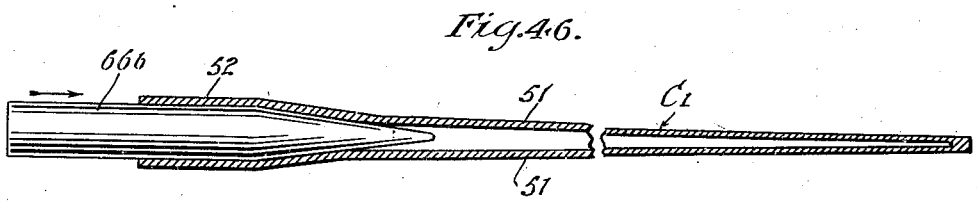
Figure 47:
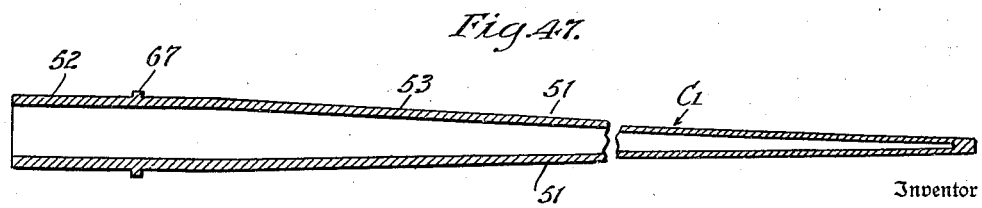

Figs. 19, 20 and 21 are transverse, vertical sectional views taken on the respective lines 19—19, 20—20 and 21—21 of Fig. 18;

Fig. 22 is a plan view, partly broken away, showing an apertured center plate adapted to form part of another form of block structure;

Fig. 23 is a longitudinal sectional view, partly in elevation, taken on the line 23—23 of Fig. 22;

Fig. 24 is a transverse sectional view, partly in elevation, taken on the line 24—24 of Fig. 22;

Fig. 25 is a plan view, partly broken away, showing a block and the center plate of Fig. 22 in assembled relation, each center plate aperture having a group of mandrels associated therewith;

Fig. 26 is a perspective view showing one of the blocks of the block structure of Fig. 31;

Fig. 27 is a plan view, partly broken away, showing another form of block structure;

Fig. 28 is a transverse sectional view taken on the line 28—28 of Fig. 27;

Fig. 29 is a longitudinal sectional view taken on the line 29—29 of Fig. 27;

Fig. 30 is an enlarged sectional view showing one of the mandrels and the coating thereon;

Fig. 31 is a perspective view showing the block structure illustrated in Fig. 27;

Fig. 32 is a perspective view showing the block and center plate of Fig. 22 in assembled relation, one set of mandrels being shown in disassembled relation;

Fig. 32a is a perspective view corresponding with Fig. 32 and showing a feature of the invention;

Fig. 33 is a plan view showing the resulting propeller blade construction after the block structure of Figs. 27 and 31 has been subjected to the final rolling operation;

Fig. 34 is an elevational view showing a propeller blade construction obtained from the elongated structure of Fig. 33;

Fig. 35 is an enlarged, vertical sectional view taken on the line 35—35 of Fig. 33;

Fig. 36 is an enlarged sectional view illustrating a step of my novel method;

Figs. 37, 38 and 39 are plan views illustrating different steps of my novel method;

Figs. 40 and 41 are plan and elevational views, respectively, showing a die arrangement for separating the plates of a propeller blade construction;

Fig. 42 is an enlarged, longitudinal sectional view taken on the line 42—42 of Fig. 40 looking in the direction of the arrows;

Fig. 43 is a longitudinal sectional view, partly in elevation, illustrating a step of my novel method;

Fig. 44 is an enlarged, transverse sectional view taken on the line 44—44 of Fig. 43;

Figs. 45 and 46 are longitudinal sectional views, partly in elevation, illustrating steps of my novel method;

Fig. 47 is a longitudinal sectional view showing another substantially complete propeller blade construction of my invention;

Fig. 48 is a longitudinal sectional view taken on the line 48—48 of Fig. 49 and is illustrative of the complementary parts of another form of block structure;

Fig. 49 is an end elevational view showing the complementary blocks of Fig. 48;

Fig. 50 is a longitudinal sectional view taken on the line 50—50 of Fig. 51;

Fig. 51 is an end elevational view showing the block structure of Fig. 50;

Fig. 52 is a plan view showing the resulting propeller blade construction after the block structure of Fig. 51 has been subjected to the final rolling operation;

Fig. 53 is a longitudinal sectional view taken on the line 53—53 of Fig. 54 and is illustrative of another form of block structure; and Fig. 54 is an end elevational view of the block structure of Fig. 53.

Referring to Figs. 1 and 2, I have shown a block, bloom, or slab 1 hereinafter termed a "block" which is formed from a single piece of steel, or equivalent, which, preferably, is plane and has uniform thickness throughout the area thereof. The block 1 comprises duplicate end sections 1a, 1a which merge into a connecting neck section 1b. The curved surface 1c of each end section 1a defines a part of a cylinder and the surfaces 1d which connect the curved surfaces 1c are planar. In addition, the block 1 is chamfered as indicated at 1e, Figs. 3 and 5. In view of the foregoing, it follows that the block 1 may be said to consist of two duplicate sections integral with each other and positioned at the opposite respective sides of a plane P extending at right angles to the longitudinal axis of said block 1.

In accordance with the invention and as indicated in Fig. 5, a suitable parting agent 2 such, for example, as zirconium silicate or other inorganic filling material is disposed to the desired thickness on the upper surface of a block 1 while the latter rests flatwise on a suitable support. Thereupon, a duplicate block 1 is disposed on the aforesaid block 1 in symmetrical relation with respect thereto. In the resulting arrangement, the lower block 1 supports the parting agent 2 and the latter, in turn, supports the upper block 1. At this stage, the two blocks are secured together by a layer 3 of weld metal which is deposited in the groove or channel defined by the contiguous chamfered surfaces 1e of the respective blocks 1 to thereby produce the block structure illustrated in Figs. 4 and 5. Any suitable welding process such, for example, as the submerged arc process may be utilized for thus depositing the aforesaid layer of weld metal 3 which extends throughout the entire periphery of the blocks 1 to secure them together and form a sealed chamber or passage within which the parting agent 2 is disposed. This chamber or passage extends longitudinally of the aforesaid block structure midway between its parallel upper and lower surfaces. As will be understood, this chamber or passage corresponds in configuration with that of the two assembled blocks 1. In the manner hereinafter described, two hollow propeller blades are obtained from the block structure described above.

After completion of the foregoing, the block structure is heated to a suitable rolling temperature, as in a range between 2200 degrees F. and 2300 degrees F. for steel whereupon the heated block structure is passed endwise through a suitable mill to roll and produce elongation thereof as shown in Figs. 6 and 7. Thereafter, in response to the necessary number of successive rolling operations of the character stated, accompanied by renewed heating if necessary, a propeller blade construction is obtained which has the intermediate configuration shown in Figs. 8 and 9 and the final elongated configuration shown in Figs. 10 and 11.

As a result of the described rolling operations, the two blocks 1 lose their identity as such and, to greater and greater extent, assume plate-like character. Eventually, as shown in Figs. 10 and 11, the two blocks 1 are transformed into plates 4 having uniform thickness throughout the area thereof, said plates 4 facing each other with the parting agent 2 between them although, of course, the latter together with the plates 4, 4 have undergone a marked decrease in thickness. Further, as a result of the described rolling operations, the weld metal layer 3 is refined and to some extent becomes amalgamated with the block material. The elongated structure of Figs. 10 and 11, then, is defined by the plates 4 which are joined together through their entire periphery and form a sealed chamber within which the parting agent 2 is disposed.

It will be understood by those skilled in the art that the parting agent 2 serves, during the rolling operations, to preserve a void or cavity between the blocks or plates, to prevent them from bonding or uniting with each other, to maintain the desired spaced relation therebetween, and to establish an internal radius at each internal edge of the rolled structure. Within the purview of the invention, any suitable parting agent may be utilized for the purpose stated.

In Fig. 10, I have indicated a plane P1 extending at right angles to the longitudinal axis of the elongated structure midway between the ends thereof, the plane P1 bearing the same relation to the elongated structure of Fig. 10 that the plane P bears to the block structure of Fig. 1. Hence, connected, duplicate twist-free propeller blade constructions are shown in Fig. 10 on opposite respective sides of the plane P1. These twist-free propeller blade constructions are of the size intended to be produced from the aforesaid block structure.

It is a feature of the invention that the aforesaid parting agent chamber or passage of the block structure of Fig. 4 has an outline in planform corresponding, to such reduced degree as is desirable and proper, substantially with the outline in planform of the chamber defined by the aforesaid twist-free propeller blade constructions which are disposed on opposite respective sides of the plane P1, Fig. 10. A rolling mill operates normally to cause elongation of a structure with little increase in the transverse dimensions thereof. Therefore, the aforesaid parting agent chamber or passage of the block structure of Fig. 4 has an outline in planform which has its length decreased to the desired extent compared with the length of the chamber defined by the two twist-free propeller blade constructions which are to be produced from said block structure. However, the transverse dimensions of said parting agent chamber or passage of the block structure 4, station-by-station, are approximately the same as the respective transverse dimensions of the chamber defined by one of the last named twist-free propeller blade constructions.

In accordance with the invention, the elongated structure of Fig. 10 is severed or separated at the plane P1 to thereby obtain two twist-free propeller blade constructions C of duplicate character, the facing plates 4 of each propeller blade construction C forming a section 5 destined to form the shank of the propeller blade and a section 6 destined to form the aerofoil surface thereof.

The last rolling operation which produces the elongated structure shown in Fig. 10 causes each of the plates 4 to have a thickness somewhat greater (to allow for machining) than the proper or intended thickness of the tubular shank of the finished propeller blade. As known in the hollow propeller blade art, the plates which define the thrust and camber surfaces of such a propeller blade, in the aerofoil section thereof, should have a thickness substantially less than that of the tubular structure forming the blade shank and they should progressively decrease in thickness or taper in a direction extending from the shank of the propeller blade toward the tip thereof.

After the elongated structure illustrated in Fig. 10 has been severed or separated as described above to produce two duplicate propeller blade constructions, a series of operations, as hereinafter described, is performed on one of them in order to produce a propeller blade which is complete except for known finishing operations. It will be understood that the described series of operations will be performed on all such propeller blade constructions in order to produce complete propeller blades.

Thus, while the parting agent 2 remains between the plates 4, each of said plates of one of the propeller blade constructions C is subjected to a plurality of milling or cutting actions, as exemplified by the cutter 7, Fig. 12, to thereby cause each of the plates 4 to have the desired tapered configuration in that section of the propeller blade destined to be the aerofoil section thereof.

It will be understood that the aforesaid milling or cutting action proceeds while the plates 4 are in close, parallel relation with respect to each other as imposed by the last rolling operation. Upon completion of this milling or cutting action, the parting compound 2 is removed from the blade construction in suitable manner, as by tapping the same while held vertical with the open end lowermost. Then, after said blade construction has been suitably trimmed, the shank section thereof is heated to suitable extent as in a range between 1550 degrees F. and 1700 degrees F. whereupon a plurality of tools or punches having progressively larger diameters, respectively, are inserted individually into the open end, as formed by the cutting action at the plane P1, Fig. 10, of the propeller blade construction which has been subjected to the aforesaid tapering operation, this piercing operation being indicated diagrammatically by the tool or punch 8, Fig. 13. As a result the blade construction is altered in the sense that a rudimentary propeller blade shank is formed therein. Thereafter, by suitable machining operations and a suitable upsetting operation, as known in the art, the aforesaid rudimentary propeller blade shank is brought approximately to its final configuration and, if desired, a ring 9, Fig. 14, is formed thereon. As regards Fig. 14, it shall be understood that it is representative of a propeller blade construction which is substantially a complete propeller blade with the exception that propeller blade twist has not been imparted thereto. Preferably, the propeller blade twist is imparted to the blade construction of Fig. 14 in the manner hereinafter described.

To this end and in accordance with the invention, I may utilize a suitable press or blow-up die as known in the art and shown in Figs. 15, 16 and 17 as comprising a lower die structure 11 suitably anchored in fixed position together with an upper die structure 12 connected to suitable hydraulic mechanism, not shown, utilizable for raising and lowering the same. As illustrated, the die structures 11 and 12 comprise suitable chambers 13 into and through which cooling water is circulated by pipes 14. The die structures 11 and 12 cooperate, when closed, to form an interior chamber 15 having the twist-imparting shape to which the propeller blade construction C is to be subjected while it is in the press.

With the upper die structure 12 in elevated position, the propeller blade construction C is positioned on the lower die structure 11 with the lower part of the ring 9 occupying that part of channel 16 which is formed in the lower die surface. Thereupon, the upper die structure 12 is moved to its lower operative position and, in so doing, the upper part of the ring 9 is caused to occupy that part of the channel 16 which is formed in the upper die surface. When thus positioned, the extreme end of the propeller blade construction shank projects beyond the cooperating die structures to slight extent as illustrated in Fig. 17.

Prior to the time that the propeller blade construction C is thus positioned in the press, the temperature thereof should be elevated in suitable manner into a range from 1600 degrees F. to 1700 degrees F. more or less. Furthermore, at this time, there should be available a source of gas under pressure of approximately 900 pounds per square inch which is made effective interiorly of the hollow blade construction during the shaping operation.

Accordingly, it is necessary to seal the otherwise open end of said blade construction C and, for this purpose, an arrangement of any suitable character, for example, as known in the art may be employed. However, preferably, I utilize a sealing arrangement of the character disclosed in United States Letters Patent No. 2,350,541.

Briefly, as herein shown, a sealing arrangement of this character comprises a vertical pin 17, Fig. 15, carried by a lug extending from the lower die structure 11. This pin 17 pivotally supports a supporting member 18 which, at its opposite end, comprises a notch with which is coactable a latch 19 having an actuating handle 20.

As illustrated in Fig. 17, the supporting member 18 comprises a central passage longitudinally alined, when said supporting member 18 is in its closed position, with the chamber 15 of the press. The neck of a circular chamber-forming structure 21 extends through this central passage and is engaged by a nut 22 to thereby secure the structure 21 to the supporting member 18.

A tubular member 23 is disposed on the structure 21 for free slidable movement. The circular flanged section 24a of a cap member 24 is threaded to one end of the member 23, said cap member 24 being slidable in a channel formed at one end of the structure 21 to the extent permitted by spaced stop surfaces formed on said structure 21 and the supporting member 18. The other end of the member 23 comprises an integral, inwardly extending flanged section 23a having a centrally disposed tubular section 23b extending to both sides thereof, said tubular section 23b being alined longitudinally with the inner chamber 15. Suitably secured to the exterior surfaces of the flanged section 23a is a plate 26 having a central passage in which one end of the tubular section 23b is snugly received. As shown in Fig. 17, a ring-like gasket 27 is disposed in a channel provided therefor in the plate 26.

The aforesaid structure 21 comprises an inwardly extending flanged section defining an inner circular opening. Suitably secured, as by screws 28, to said flanged section is a clamping ring 29 and the base of a sealing cup 30 which slidably engages the interior surface of the member 23 in sealing relation.

Disposed between the neck of the structure 21 and the tubular section 23b is a helical spring 31 utilizable for biasing the tubular member 23 and all parts carried thereby in a direction from left to right, Fig. 17.

Associated interiorly and in threaded relation with the neck of the structure 21 is a conduit extension 32a of a channel-forming structure 32 with which is associated one end of a pipe 33 leading to the aforesaid source of air under pressure.

Assuming that the supporting member 18 is in its open position and that the die structure 11 is in its upper position, a propeller blade construction C of the character shown in Fig. 14, after the temperature thereof has been elevated as described, is disposed upon the die structure 11 whereupon the press is actuated to move the die structure 12 to its lower position. Thereupon, the member 18 is moved to its closed position and latched to positively seal the hollow chamber of the propeller blade construction C. At this time, gas under pressure, as described, is admitted through the pipe 33 and cooling water is circulated through the pipe 14. As the shaping-setting operation proceeds, the die structures cause the blade surfaces to take a set configuration corresponding to the configuration thereof, such blade surfaces being interiorly supported by the gas under pressure. After a suitable period has elapsed such, for example, as several minutes, the operation is completed whereupon the source of gas is disconnected, the member 18 is moved to its open position, the die structure 12 is elevated and the shaped propeller blade B shown in Figs. 18-21 inclusive removed from the lower die structure 11.

As hereinbefore stated, the propeller blade construction C is free from twist. The operation referred to immediately above imparts the desired final twist and final profile thereto. Further, the operation referred to immediately above, by virtue of the heat treatment, improves the physical qualities of the metal forming the propeller blade and removes minor irregularities such as depressions or protuberances from the blade surface. Still further, the operation referred to immediately above imparts final profile to the blade B as shown in Figs. 19-21 inclusive.

Referring to Fig. 26, I have shown a block 40 of oblong, rectangular configuration and having uniform thickness throughout the area thereof. As illustrated in Figs. 27, 28, 29 and 31, a pair of the blocks 40 and an intervening center plate 41 are utilized to form a block structure from which, eventually, there is obtained a pair of duplicate propeller blades, the blocks 40 and center plate 41 being formed from steel or other suitable metal.

In accordance with the invention, the center plate 41 is somewhat smaller than a block 40 although the configuration thereof is the same as the block configuration. The center plate 41 has uniform thickness throughout the area thereof and this thickness is substantially less than that of a block 40. It is a feature of the invention that the center plate 41 comprises two duplicate apertures 41a, Fig. 22, which are separated from each other by a center plate section 41b and disposed symmetrically on opposite respective sides of the transverse center plane P2 of said center plate 41. The apertures 41a extend in straight-line relation longitudinally of the center plate 41 and they face in opposite directions. Each aperture 41 is defined by a curved surface 41c each of which at its opposite ends, merges into the respective surfaces 41d. The sets of surfaces 41d are at the respective ends of the center plate 41. The two curved surfaces 41c are adjacent each other and are separated by the aforesaid center plate section 41b.

In accordance with the invention, each of the center plate apertures 41a is adapted to receive, in close-fitting relation, a set of steel or other metallic mandrels 42, 43 and 44, Fig. 32, having uniform thickness slightly less than that of the center plate 41. The mandrels 42 and 44 are outside mandrels whereas the mandrel 43 is a wedging mandrel.

In accordance with the invention, a block 40 is horizontally disposed as shown in Fig. 25 whereupon a center plate 41 is located thereon in proper position. Then, one set of mandrels 42, 44 are disposed at the respective sides of one of the apertures 41a. Thereupon, the center mandrel 43 is passed endwise between the mandrels 42 and 44 and, by a wedging action, all of the mandrels are properly positioned. After completion of the foregoing, the other set of mandrels, in similar manner, are positioned in the center plate apertures 41a at the right, Fig. 25. At this time, another block 40 may be disposed on the center plate 41 and the groups of mandrels associated therewith. This substantially completes the formation of the block structure.

Prior to the time that the blocks, the center plate and the mandrels were assembled as described above, a parting agent, as indicated by stippling in Figs. 25 and 32, is applied to selected surfaces thereof. This parting agent may be of any suitable character such, for example, as zirconium oxide, ferrous oxide or other inorganic materials mixed with water and silicate of soda. After application thereof to the mandrels, they have the same thickness as that of the center plate 41.

Thus, as shown in Fig. 32, the lower block 40 has a parting agent, as aforesaid applied thereto. This application is made throughout the areas to be engaged by the respective sets of mandrels. In a similar manner, the upper block 40 has a parting agent applied thereto throughout the respective areas thereof which are to engage the sets of mandrels. Further, as shown in Fig. 32, the surfaces of the center plate 41 defining the respective apertures 41a have the parting agent applied thereto. Still further, all surfaces of all of the mandrels are covered with the parting agent as indicated at 42a, Fig. 30.

After the parting agent has been applied as described, the blocks, the center plate and the mandrels are assembled in the manner referred to above. Thereupon, this assembly is tack-welded as indicated at 46, Fig. 27, whereby the parts are positively retained in proper relation with respect to each other so that they may be subjected to the final welding operation as hereinafter described. In lieu of tack-welding, any equivalent operation may be employed for the purpose stated. Prior to the time that the blocks and center plate are assembled as described above, suitable cleaning fluids should be used to remove rust or other foreign matter from the surfaces thereof. Further, prior to the time that the aforesaid assembly is tack-welded, the two blocks 40 and the center plate 41 should be firmly clamped together to prevent shifting, parting, or warping due to the heat stress of welding. Still further, when high carbon steels are used, prior to the described tack-welding operation, the entire block assembly should be preheated to approximately 400 degrees F.

At this time, the block structure is in the condition shown in Figs. 27, 28 and 29. By reason of the fact that the center plate 41 is smaller than the blocks 40, there is a channel 48 extending throughout the entire periphery of said block structure midway between the upper and lower parallel surfaces thereof. In connection with this channel 48, the length of the mandrels is so chosen that, when properly seated, they do not extend into the channel to any substantial extent.

Thereupon, in accordance with the invention, a layer 49 of weld metal, Fig. 31, is deposited in the channel 48 to thereby produce the finished block structure. To this end, the submerged arc or other equivalent welding process may be utilized for completely closing the channel 48 to peripherally secure the blocks 40 and the center plate 41 together and cause the respective apertures 41a to form chambers or passages, preferably sealed, within which the respective sets of mandrels are disposed. These chambers or passages extend longitudinally of the block structure midway between the parallel upper and lower surfaces thereof.

After completion of the foregoing, the block structure of Fig. 31 is heated to a suitable temperature, as in a range between 2200 degrees F. and 2300 degrees F. whereupon the heated block structure is passed endwise through a suitable mill to roll and produce elongation thereof. This operation is repeated the necessary number of times, accompanied by renewed heating if necessary, to obtain a propeller blade construction having the final elongated configuration shown in Fig. 33.

As a result of the described rolling operations, the two blocks 40 and the center plate 41 are pressure-welded together as indicated at 50, Figs. 33 and 35. In addition, the weld metal layer 49 becomes amalgamated to some extent with the adjacent metal. However, by reason of the applied parting agent, all of the mandrels retain their identity and do not become welded to the adjacent metallic material, Fig. 35. Accordingly, resulting from the described rolling operations, the blocks 40, between the sets of mandrels are transformed into plates 51, Fig. 35, which are bordered by substantially integral metal.

In Fig. 33, I have indicated a plane P3 extending at right angles to the longitudinal axis of the elongated structure midway between the ends thereof, the plane P3 bearing the same relation to the elongated structure of Fig. 33 that the plane P2 bears to the center plate 41 of Fig. 22. Hence, connected, duplicate twist-free propeller blade constructions are shown in Fig. 33 on opposite respective sides of the plane P3. These twist-free propeller blade constructions are of the size intended to be produced from the block structure shown in Fig. 31.

It is a feature of the invention that each of the aforesaid apertures 41a in the center plate 41 have an outline in planform corresponding, to such reduced degree as is desirable and proper, substantially with the outline in planform of the chamber defined by each of the aforesaid twist-free propeller blade constructions which are disposed on opposite respective sides of the plane P3, Fig. 33. As hereinbefore stated, a rolling mill operates normally to cause elongation of a structure with little increase in the transverse dimensions thereof. Therefore, each of the aforesaid apertures 41a of the center plate 41 should have an outline in planform which has its length decreased to the desired extent compared with the length of the chamber defined by the twist-free propeller blade construction which is to be produced from one-half of the block structure illustrated in Figs. 27, 28, 29 and 31. However, the transverse dimensions of each aperture 41a, station-by-station, should be approximately the same as the respective transverse dimensions of the chamber defined by each of the last named twist-free propeller blade constructions.

In accordance with the invention, the elongated structure of Fig. 33 is severed or separated at the plane P3 to thereby obtain two twist-free propeller blade constructions C1 of duplicate character, the facing plates 51 of each propeller blade construction C1 forming a section 52 destined to form the shank of the propeller blade and a section 53 destined to form the aerofoil surface thereof.

The final rolling operation which produces the elongated structure shown in Fig. 33 causes each of the plates 51 to have a thickness somewhat greater (to allow for machining) than the proper or intended thickness of the tubular shank of the finished propeller blade. As hereinbefore stated, it is known in the hollow propeller blade art that the plates which define the thrust and camber surfaces of the propeller blade, in the areofoil section thereof, should have a thickness substantially less than that of the tubular structure forming the propeller blade shank and it is further known that these plates should progressively decrease in thickness or taper in a direction extending from the shank of the propeller blade toward the tip thereof.

After the elongated structure illustrated in Fig. 33 has been severed or separated as described above to produce two duplicate propeller blade constructions, a series of operations, as hereinafter described, is performed on one of them in order to produce a substantially complete propeller blade. It will be understood that the described series of operations will be performed on all such propeller blade constructions in order to produce substantially complete propeller blades.

Thus, while the mandrels 42, 43 and 44 remain between the plates 51, each of said plates of one of the propeller blade constructions C1 is subjected to a plurality of milling or cutting actions to thereby cause each plate 51 to have the desired tapered configuration in that section of the propeller blade construction destined to be the aerofoil section of the propeller blade, Fig. 36.

In Fig. 33, I have illustrated by dotted lines the outline of the hereinbefore described apertures 41a or the mandrel-containing chambers or passages after they have been finally elongated by the rolling operation. Similarly, by dotted lines, I have illustrated the mandrels 42, 43 and 44 after each of them has been finally elongated. It will be understood, however, that the elongated propeller blade construction, as finally rolled and as shown in Fig. 33, is nothing other than a rolled metallic structure entirely devoid of any indication of the location of the chambers or passages which contain the respective sets of mandrels and plugs.

In accordance with the invention and referring to Fig. 37, the location of the aforesaid chamber or passage in one of the propeller blade constructions C1 is obtained by subjecting said propeller blade construction to an X-ray operation. This may be done in any suitable or convenient manner. Thus, as shown in Fig. 37, eight or any other suitable number of developed X-ray negatives 54 are indicated as suitably secured together substantially at their margins in the relation shown to thereby obtain a composite negative which exhibits an outline 55 of the chamber or passage in which the mandrels 42, 43 and 44 of the blade construction C1 are received. From the practical viewpoint, it will be understood that the aforesaid negatives 54 will be exposed individually as regards respective end-to-end sections of the propeller blade construction in order to obtain the composite negative referred to above.

After the composite negative has been developed, the outline 55a of the aforesaid mandrel-containing chamber or passage is traced on a transparent or translucent sheet of paper 56, or equivalent, whereupon as shown in Fig. 38, this sheet 56 is disposed in the same relation with respect to said propeller blade construction C1 as was taken by the aforesaid composite negative, Fig. 37. At this time, an outline 57 following the outline 55a, Figs. 38 and 39, is suitably inscribed on the metal surface of the propeller blade construction and, as will be understood, the outline 57 precisely locates the mandrel-containing chamber or passage of said blade construction C1. Alternatively, if desired, the X-ray negative may be employed directly for the purpose stated.

Thereupon, as indicated in Fig. 39, a second outline 58 may be suitably inscribed on the blade construction C1 exteriorly of the outline 57 and spaced equidistantly therefrom. At this time, by employing suitable cutting or burning mechanism, not shown, the metal 59 of the blade construction C1, exteriorly of the outline 58, is trimmed or removed to thereby more nearly complete said blade construction.

After completion of the foregoing, the end of the propeller blade construction C1 including short end portions of the mandrels are cut or severed at the plane P4, Fig. 39, to thereby open the hereinbefore described mandrel-containing chamber or passage of the propeller blade construction and free the mandrels for subsequent removal. At this time, as shown in Figs. 40–42, a suitable press or blow-up die is utilized in order to separate or space apart the plates 51 to such extent that the mandrels 42, 43 and 44 may be readily removed from the chamber or passage in which, until this stage, they had been contained. This press or blow-up die may be of any suitable character and, as illustrated, it comprises a lower die structure 60 and an upper die structure 61, these die structures corresponding, respectively, in a general manner with the hereinbefore described die structures 11, 12 of Figs. 15–17 inclusive. Preferably, the die structures 60, 61, when closed, define an interior chamber partially but not entirely defining the twist configuration of a complete propeller blade.

In accordance with the invention, a metallic housing or chamber 62 is welded, as indicated at 63 to the shank end of the propeller blade construction C1 as the same is illustrated in Fig. 39 after severance at the plane P4, the housing 62 having a pipe or conduit 64 communicating therewith. The propeller blade construction C1, after association of the housing 62 therewith, is heated to a temperature ranging from 1600 degrees F. to 1700 degrees F. more or less and, then, with the upper die structure 61 in elevated position, said propeller blade construction C1 is positioned on the lower die structure 60 in the manner shown in Fig. 42. Thereupon, the upper die structure 61 is moved to its lower position and, at this time, nitrogen or other suitable gas under pressure of 100 to 150 pounds per square inch, more or less, is connected to the conduit 64, this gas, under the pressure stated, becoming effective interiorly of said propeller blade construction C1. As the operation proceeds, the die structures 60, 61 cause the surfaces of the propeller blade construction to take a set, partial twist configuration corresponding to the configuration of said die structures, said blade construction surfaces, at this time, being interiorly supported by gas pressure. After a suitable period has elapsed such, for example, as several minutes, the operation is completed whereupon the source of gas is disconnected, the die structure 61 is elevated and the partially pitched propeller blade construction removed from the lower die structure 60. As a result of this operation, the plates 51 of the propeller blade construction C1 are separated, for example, as illustrated in Figs. 42, 43 and 44. After completion of the foregoing, the shank of the propeller blade construction C1 is severed at the plane P5, Fig. 42, to thereby obtain the construction shown in Figs. 43 and 44. By reason of the fact that the plates are separated as described above, the removal of the elongated mandrels 42, 43 and 44 becomes a relatively simple matter. This is accomplished by first removing the wedging mandrel 43 whereupon the side mandrels 42, 44 may be removed in succession.

After completion of the foregoing operation, the shank section of the blade construction C1 is heated to suitable extent, as in the range between 1550 degrees F. and 1700 degrees F. whereupon, as indicated in Figs. 45 and 46, a plurality of tools or punches 66, ... 66b having progressively larger diameters, respectively, are inserted individually into the open end of said propeller blade construction C1. As a result, the propeller blade construction C1 is altered in the sense that a rudimentary propeller blade shank is formed. Thereafter, by suitable machining operations and by a suitable upsetting operation, as known in the art, the aforesaid rudimentary propeller blade shank is shaped approximately to its final configuration and a ring 67, Fig. 47, is formed thereon. As regards Fig. 47, it shall be understood that it is representative of a propeller blade construction which has some twist (although it may be entirely without twist) and is substantially a complete propeller blade with the exception that final twist and profile have not been imparted thereto. After the propeller blade construction C1 of Fig. 47 is obtained, final twist and final profile are imparted thereto in a press or blow-up die of the character shown in Figs. 15, 16 and 17. This operation proceeds in the same manner as hereinbefore described with respect to the propeller blade construction C of Fig. 14. Hence, further description of this operation is considered unnecessary.

A certain sequence of operations has been hereinbefore described with respect to the various steps of the invention illustrated in Figs. 34–39 inclusive. Obviously, within the purview of the invention, the sequence of these steps may be changed, if desired. Thus, for example, there may be an initial X-ray exposure on the propeller blade construction C1 as it exists in Fig. 34. Further, at this time, the end of said propeller blade construction including the ends of the mandrels may be severed or cut at a plane corresponding with the plane P4 of Fig. 39. Thereafter, the various milling steps may be proceeded with and, subsequently, a final X-ray exposure may be taken of the milled propeller blade construction in order to precisely locate the interior chamber thereof.

With respect to the form of the invention first described, it was stated that the parting agent 2 establishes an internal radius at each internal edge of the rolled structure. This, for known reasons, is desirable in the propeller blade art. As regards the mandrel and center plate arrangement illustrated in Fig. 32, it is desirable for the outside mandrels 42, 44 and the center plate 41 to be of the character illustrated in Fig. 32a in order to form the desired internal radius at each propeller blade edge. Thus, in Fig. 32a, the respective mandrels 42, 44 are shown as having curved edged surfaces 42e, 44e adapted to be seated, in close-fitting engagement, with the respective channels 41e of the center plate 41. These edged surfaces and channels have desired lengths and, due to the presence thereof, internal fillets are produced at the respective edges of the propeller blade constructions C1 of Fig. 47, these internal fillets terminating at a desired distance from the tip of said propeller blade construction. Formation of an internal cavity having a desired smooth radius at each edge of the propeller blade is particularly advantageous because avoiding the possibility of small depressions, crevices or other irregularities. With such an arrangement, the resulting propeller blade has greater strength and cause for failure due to stress propagation is eliminated.

Although not illustrated, it will be understood that the hereinafter described sets of mandrels 74, 76 and 81, 83 should have curved edge surfaces corresponding with the above noted mandrel surfaces 42e, 44e and that the surfaces of the respective block structures engaged thereby should be suitably channelled for the reception of said curved edge surfaces.

Referring to Figs. 50, 51, I have shown a modified form of the invention wherein a block structure 70 of oblong, rectangular configuration is formed from a pair of complementary blocks 71, 71 of duplicate character which are formed from steel or other suitable metal. Each of the blocks 71 comprises two duplicate apertures 71a disposed midway between the parallel block surfaces and being separated from each other by a block section 71b. The apertures 71a extend in straight-line relation longitudinally of each block 71 and they face in opposite direction. As the blocks 71 are positioned in Figs. 48 and 49, facing surfaces thereof are chamfered as indicated at 71c. In accordance with the invention, the blocks 71 are arranged with respect to each other as shown in Fig. 51 and, when thus arranged, the chamfered surfaces 71c define two longitudinally extending channels in which layers of weld metal 72 are deposited, respectively, by the submerged arc process, or equivalent. By so doing, the two blocks 71 are secured to each other to form the block structure 70.

As a result of the described operation, the sets of apertures 71a at opposite respective ends of the blocks 71, Fig. 48, cooperate to form duplicate chambers or passages 73a, Fig. 50, which are separated from each other by a block structure section 73b. Each chamber or passage 73a is a duplicate or substantially so of each of the hereinbefore described apertures 41a of the center plate 41. Hence, each chamber or passage 73a has an outline in planform corresponding, to such reduced degree as is desirable and proper, substantially with the outline in planform of the chamber defined by a twist-free propeller blade construction which is to be produced from one-half of the block structure 70 shown in Figs. 50 and 51. As hereinbefore stated, a rolling mill operates normally to cause elongation of a structure with little increase in the transverse dimensions thereof. Therefore, each of the aforesaid chambers or passages 73a has an outline in planform which has its length decreased to the desired extent compared with the length of the chamber defined by the twist-free propeller blade construction which is to be produced from one-half of the block structure illustrated in Figs. 50 and 51. However, the transverse dimensions of each chamber or passage 73a, station-by-station, are approximately the same as the corresponding transverse dimensions of the chamber defined by said last named twist-free propeller blade construction.

After formation of the block structure 70 in the manner described above, a set of mandrels 74, 75, 76 are passed endwise in succession into each of the above described chambers or passages 73a of the block structure 70. After this has been done, each set of mandrels may be secured in position by weld metal as indicated at 77. It will be understood that the mandrels 74, 75, 76 are duplicates or substantially so of the hereinbefore described mandrels 42, 43 and 44, respectively. As with the form of the invention previously described, the block structure surfaces defining each chamber or passage 73a, prior to insertion of the mandrels, may be coated in suitable manner with a suitable parting agent such, for example, as hereinbefore described. It will be understood that all of the mandrels, before association with the block structure of Fig. 50 are coated or painted with a suitable parting agent, for example, as described above.

After completion of the foregoing, the block structure of Figs. 50 and 51 is heated to a suitable temperature, as in a range between 2200 degrees F. and 2300 degrees F. whereupon the heated block structure is passed through a suitable mill to roll and produce elongation thereof. This operation is repeated the necessary number of times, accompanied by renewed heating if necessary, to obtain a propeller blade construction having the final elongated configuration shown in Fig. 52. This propeller blade construction differs from the edge-welded propeller blade constructions of Figs. 10 and 47 in that, on both surfaces thereof, a welded joint, as indicated at 78, extends longitudinally thereof midway between the leading and trailing edges. These welded joints are formed, respectively, by the hereinbefore described layers of weld metal 72 and it will be understood that, due to the rolling operation, the weld metal has become amalgamated to some extent with the block structure metal.

After the propeller blade construction of Fig. 52 is produced, operations are performed which are identical with those hereinbefore described with respect to the structures of Figs. 34-47 inclusive. Eventually, then, a complete propeller blade construction having some twist, if desired, is obtained from the block structure 70 of Figs. 50 and 51, this propeller blade construction being generally similar to the propeller blade construction shown in Fig. 47. Thereafter, this complete propeller blade construction which was obtained from the block structure 70 may have final twist and final profile imparted thereto in a press or blow-up die of the character illustrated in Figs. 15-17 inclusive. As a result, there is obtained a substantially complete propeller blade of the general character shown in Figs. 18-21 inclusive.

Referring to Figs. 53 and 54, I have shown another form of the invention wherein a one-piece block structure 80 is produced by a suitable casting operation. During the casting operation, duplicate chambers or passages 80a are formed in the block structure 80 at the respective opposite ends thereof midway between the parallel outer surfaces thereof. The passages or chambers 80a extend longitudinally of the block structure 80 and face in opposite directions. They are separated from each other by an integral section of metal 80b and they are open at the respective ends of said block structure 80. Each chamber or passage 80a is a duplicate or substantially so of each of the chambers or passages 73a of the block structure 70. Hence, each chamber or passage 80a has an outline in planform corresponding, to such reduced degree as is desirable and proper, substantially with the outline in planform of the chamber defined by a twist-free propeller blade construction which is to be produced from one-half of the block structure 80 shown in Figs. 53 and 54. As hereinbefore stated, a rolling mill operates normally to cause elongation of a structure with little increase in the transverse dimensions thereof. Therefore, each of the aforesaid chambers or passages 80a has an outline in planform which has its length decreased to the desired extent compared with the length of the chamber defined by the twist-free propeller blade construction which is to be produced from one-half of the block structure illustrated in Figs. 53 and 54. However, the transverse dimensions of each chamber or passage 80a, station-by-station, are approximately the same as the corresponding transverse dimensions of the chamber defined by said last named twist-free propeller blade construction.

In accordance with the invention, a set of mandrels 81, 82, 83 are passed endwise in succession into each of the above described chambers or passages 80a of the block structure 80. After this has been done, each set of mandrels may be fixed in position by weld metal as indicated at 84. It will be understood that the mandrels 81, 82, 83 are duplicates or substantially so of the hereinbefore described mandrels 74, 75, 76, respectively.

As with the forms of the invention previously described, the block structure surfaces defining each chamber or passage 80a prior to the insertion of the mandrels, may be coated with a suitable parting agent such, for example, as hereinbefore described. It will be understood that all of the mandrels, before association with the block structure 80, are coated or painted with a suitable parting agent, for example, as described above.

After the mandrels have been associated, in the manner described, with the block structure 80, operations are performed which are identical with those hereinbefore described with respect to the structures of Figs. 33-47 inclusive. Eventually, then, a complete propeller blade construction having some twist, if desired, is obtained from the block structure 80 of Figs. 53 and 54, this propeller blade construction being generally similar to the propeller blade construction shown in Fig. 47. Thereafter, this complete propeller blade construction which was obtained from the block structure 80 may have final twist and final profile imparted thereto in a press or blow-up die of the character illustrated in Figs. 15-17 inclusive. As a result, there is obtained a substantially complete propeller blade of the general character shown in Figs. 18-21 inclusive.

With respect to the various forms of the invention involving the application of a paint or paste to those metallic surfaces which are not to be amalgamated as a result of the rolling operations, it shall be understood that such paint or paste should be substantially dry prior to the time that the rolling operation is proceeded with. Further, as regards the forms of the invention last referred to, it may be desirable and practical, under some circumstances, to omit the application of paint or paste to the block surfaces and to confine such paint or paste application solely to the mandrels.

As regards the various forms of the invention hereinbefore described, it is to be noted that, in each instance, the block structure is of such character that a pair of propeller blades are obtained therefrom. The invention, however, is not to be thus limited since, if desired, each block structure may be of such character that one, two or more propeller blades are obtained therefrom as a result of the various operations and, further, the block structure chambers or passages may be disposed tip-to-tip, tip-to-shank or shank-to-shank as desired.

As regards the drawings, it has been desirable from applicant's viewpoint for various groups of figures to be drawn on different scales, respectively, the figures of each group, however, being drawn to the same scale. This applies to Figs. 1–5 inclusive; Figs. 6–13 and Fig. 13a; Fig. 14; Figs. 15 and 16; Fig. 17; Fig. 18; Figs. 19–21 inclusive; Figs. 22–31 inclusive; Fig. 32; Figs. 33 and 34; Figs. 35 and 36; Figs. 37–39 inclusive; Figs. 40 and 41; Fig. 42; Fig. 43; Fig. 44; Figs. 45 and 46; Fig. 47; Figs. 48–51 inclusive; Fig. 52; Figs. 53 and 54.

Ordinarily, the respective chambers or passages which receive the parting agent of Figs. 1–5 inclusive or the painted or coated mandrels of the other forms of the invention are entirely sealed prior to initiation of the rolling operation. However, under some circumstances, it may be desirable for these passages to be vented to slight extent in order to permit escape of expanding gases during the heating and rolling operations.

Although specific forms of a press or blow-up die have been illustrated and described for imparting final twist and final profile to the propeller blade constructions and for causing some separation of the propeller blade construction plates in order to permit removal of the mandrels, it shall be understood that the invention is not to be limited to these particular arrangements. As well, if desired, other equivalent presses, blow-up dies or equivalent may be utilized.

Considering generally the several variations in the methods herein described, propeller blades constructed in accordance therewith are advantageous in that the grain structure of the metal is devoid of weld metal or grain line irregularities resulting from a multiplicity of welded joints, seams and the like. Such a metallic structure is obtained by reason of the fact that the originally paired steel blocks, which form the initial blank or ingot, are intimately joined together into one homogeneous mass, by hot rolling operations, in all regions thereof excepting those where the parting compound functions to prevent a juncture.

Thus, a propeller blade is obtained which is uniform and sound metallurgically without any dendritic structure and which presents an internal chamber or cavity having a regular, uniform surface and border line contour without the costly and complex milling, blanking, shaping, welding, repeated heat-treatment operations, grinding and internal copper fillet casting operations utilized heretofore to produce a propeller blade from a pair of plate members joined together in facing relation and forming an interior chamber therebetween.

With respect to the form of the invention illustrated in Figs. 22–31 inclusive, it has been hereinbefore stated that the center plate 41 is disposed on the block 40 whereupon the sets of mandrels are disposed in the respective apertures 41a, the block structure being completed by subsequent disposition of another block 40 on the center plate 41. As well, if desired, the two blocks 40 may be associated with the center plate 41 therebetween and, thereafter, the respective sets of mandrels may be moved successively endwise into the apertures 41a.

Although the elongation of the hereinbefore described block structures has been described solely with respect to rolling operations, it shall be understood that the invention is not to be thus limited. Thus, for example, it may be desirable, under some circumstances, for a selected block structure, initially, to be subjected to a pressing operation. Thereafter, in the manner described, the block structure is subjected to the necessary number of rolling operations.

The term "parting agent" has been hereinbefore used to describe (1) the inorganic filling material which is disposed between the blocks 1, Fig. 5, and (2) the paint or coating which is applied to the mandrels and/or the block surfaces engaged thereby. This term, as used in the appended claims, shall be understood as having the generic meaning referred to immediately above.

As at present preferred, the hereinbefore described passages or chambers which receive the parting agent or coated mandrels are disposed midway between substantially parallel block structure surfaces, for example, as shown in Fig. 5 with respect to the upper and lower surfaces of the block structure. It shall be understood, however, that the invention is not to be thus limited since, under some circumstances, it may be desirable to locate such chambers or passages non-symmetrically with respect to said block structure surfaces in order to make one portion thicker than the other.

While the invention has been described with respect to certain particular preferred examples which give satisfactory results, it will be understood by those skilled in the art after understanding the invention, that various changes and modifications may be made without departing from the spirit and scope of the invention, and it is intended therefore in the appended claims to cover all such changes and modifications.

I claim:

1. The method of producing a propeller construction which consists in preparing a filler plate with an opening analogous to the foreshortened planform of a propeller blade, the edge of said opening being grooved, preparing a multi-part chamfered edge flat mandrel having planform similar to but smaller than the filler plate opening the mandrel being thinner than said filler plate and being coated with a refractory parting compound, assembling said multi-part mandrel in said filler plate opening with the chamfered edges thereof engaging the grooves in the edge of the filler plate opening, embracing said filler plate and mandrel between two flat plates and securing said plates to form a block structure, heating said block structure and longitudinally rolling it to weld said flat plates to said filler plates and to extend the structure lengthwise without substantially changing its width and with concurrent thinning of all elements of the structure in proportion to the thinning of the structure as a whole whereby said filler plate opening and mandrel extend lengthwise to a planform corresponding to that of a propeller blade, transferring, after rolling the structure, the outline of said mandrel to an external surface of the structure, trimming the structure to a planform corresponding to said transferred mandrel outline, expanding the central parts of the outer plates of said structure away from one another by the application of spreading pressure internally of said metal plates, machining the exterior surfaces of said plate to a desired profile, withdrawing the parts of said multi-part mandrel from the structure to leave a hollow blade construction and in then expanding said blade construction to propeller blade form by the application of pressure to the interior surfaces thereof.

2. The method of producing a propeller construction which consists in preparing a filler plate with an opening analogous to the foreshortened planform of a propeller blade, the edge of said opening being grooved, preparing a multi-part chamfered edge flat mandrel having planform similar to but smaller than the filler plate opening the mandrel being thinner than said filler plate and being coated with a refractory parting compound, assembling said multi-part mandrel in said filler plate opening with the chamfered edges thereof engaging the grooves in the edge of the filler plate opening, embracing said filler plate and mandrel between two flat plates and securing said plates to form a block structure, heating said block structure and longitudinally rolling it to weld said flat plates to said filler plates and to extend the structure lengthwise without substantially changing its width and with concurrent thinning of all elements of the structure in proportion to the thinning of the structure as a whole whereby said filler plate opening and mandrel extend lengthwise to a planform corresponding to that of a propeller blade, transferring, after rolling the structure, the outline of said mandrel to an external surface of the structure, trimming the structure to a planform corresponding to said transferred mandrel outline, withdrawing the parts of said multi-part mandrel from the structure to leave a hollow blade construction and in then expanding said blade construction to propeller blade form by the application of pressure to the interior surfaces thereof.

3. The method of producing a propeller construction which consists in preparing a filler plate with an opening analogous to the foreshortened planform of a propeller blade, the edge of said opening being grooved, preparing a multipart chamfered edge flat mandrel having planform similar to but smaller than the filler plate opening the mandrel being thinner than said filler plate and being coated with a refractory parting compound, assembling said multi-part mandrel in said filler plate opening with the chamfered edges thereof engaging the grooves in the edge of the filler plate opening, embracing said filler plate and mandrel between two flat plates and securing said plates to form a block structure, heating said block structure and longitudinally rolling it to weld said flat plates to said filler plates and to extend the structure lengthwise without substantially changing its width and with concurrent thinning of all elements of the structure in proportion to the thinning of the structure as a whole whereby said filler plate opening and mandrel extend lengthwise to a planform corresponding to that of a propeller blade, machining and trimming the exterior surfaces of said plates to a desired profile and having edges in certain relation to the planform of the opening, withdrawing the parts of said multi-part mandrel from the structure to leave a hollow blade construction and in then expanding said blade construction to propeller blade form by the application of pressure to the interior surfaces thereof.

WALLACE C. JOHNSON.

REFERENCES CITED

The following references are of record in the file of this patent:

UNITED STATES PATENTS

| Number | Name | Date |
|---|---|---|
| 29,276 | Holmes | July 24, 1860 |
| 146,868 | Brooks | Jan. 27, 1874 |
| 332,406 | Libby | Dec. 15, 1885 |
| 652,986 | Husener | Feb. 6, 1900 |
| 1,527,780 | Bonte | Feb. 24, 1925 |
| 1,723,659 | Rosenqvist | Aug. 6, 1929 |
| 1,748,364 | Ray | Feb. 25, 1930 |
| 1,751,758 | Ray | Mar. 25, 1930 |
| 1,916,027 | Weinberg | June 27, 1933 |
| 1,938,633 | Maskrey | Dec. 12, 1933 |
| 1,956,818 | Acre | May 1, 1934 |
| 2,007,775 | Smith | July 9, 1935 |
| 2,109,780 | Mott | Mar. 1, 1938 |
| 2,159,043 | Orr | May 23, 1939 |
| 2,174,792 | Lampton | Oct. 3, 1939 |
| 2,212,481 | Sendzimir | Aug. 20, 1940 |
| 2,399,650 | Moyer | May 7, 1946 |

FOREIGN PATENTS

| Number | Country | Date |
|---|---|---|
| 302,606 | Great Britain | Mar. 17, 1930 |
| 394,584 | Great Britain | June 29, 1933 |